(12) United States Patent
Whittier et al.

(10) Patent No.: US 10,366,351 B2
(45) Date of Patent: Jul. 30, 2019

(54) INFORMATION STANDARDIZATION AND VERIFICATION

(71) Applicant: EXPERIAN HEALTH, INC, Franklin, TN (US)

(72) Inventors: Dustin Ryan Whittier, Nashville, TN (US); Patrick Harkins

(73) Assignee: EXPERIAN HEALTH, INC., Franklin, TN (US)

( * ) Notice: Subject to any disclaimer, the term of this patent is extended or adjusted under 35 U.S.C. 154(b) by 609 days.

(21) Appl. No.: 13/651,051

(22) Filed: Oct. 12, 2012

(65) Prior Publication Data

US 2013/0110525 A1 May 2, 2013

Related U.S. Application Data

(60) Provisional application No. 61/547,478, filed on Oct. 14, 2011.

(51) Int. Cl.
*G06Q 10/00* (2012.01)
(52) U.S. Cl.
CPC .................... *G06Q 10/00* (2013.01)
(58) Field of Classification Search
None
See application file for complete search history.

(56) References Cited

U.S. PATENT DOCUMENTS

| 8,490,004 B2* | 7/2013 | Shuster ............ 715/760 |
| 2003/0112942 A1* | 6/2003 | Brown ............ G06Q 20/4037 379/196 |
| 2011/0066547 A1* | 3/2011 | Clark et al. ............ 705/38 |

OTHER PUBLICATIONS

PASSPORT: http://www.passporthealth.com (from Jun. 2008-Mar. 2010) publically archived accessed from Archive.Org.*

* cited by examiner

*Primary Examiner* — Douglas W Owens
*Assistant Examiner* — Laura Yesildag
(74) *Attorney, Agent, or Firm* — Merchant & Gould P.C.

(57) ABSTRACT

Ensuring that a user's demographic data is correct so that billing statements may be sent to a correct address for collecting payment(s) from the user is a challenge many service providers face. Automatic information standardization and verification is provided. When a user's demographic information is inputted into an information system, address information is standardized into a standard format, a breadth of a verification to perform for the user is determined, and cross-matching the user's demographic information with information provided by one or more third party data sources is performed. Results may be provided in near real-time so that any inconsistencies may be corrected on the front-end and thus avoid unnecessary operation costs and improving billing and statement delivery.

18 Claims, 3 Drawing Sheets

INFORMATION STANDARDIZATION AND VERIFICATION

CROSS REFERENCE TO RELATED APPLICATIONS

The present application claims priority to U.S. Provisional Patent Application No. 61/547,478 filed Oct. 14, 2011, the disclosure of which is hereby incorporated by reference in its entirety.

BACKGROUND

In the process of collecting payment from a patient or client, a challenge that a service provider may face is ensuring that the patient or client's record data is correct so that billing statements may be sent to a correct address. Oftentimes, service providers, such as healthcare providers, receive unopened billing statements that are returned to the service provider because of incorrect patient or client information, such as address information.

Some service providers may perform an address verification procedure to search a data source, which may be a third party data source, for a patient or client's address information. If address verification is performed after billing statements are returned to the service provider, the process of researching and identifying correct addresses, reprinting statements, and resending billing statements to the patients or clients may be costly. Additionally, if a service provider performs address verification on the front end before billing statements are sent to patients and clients, searching third party data sources may be expensive and/or time-consuming.

It is with respect to these and other considerations that the present invention has been made.

SUMMARY

The above and other problems are solved by providing automatic information standardization and verification. When entering demographic information for a person into an information system, the entered demographic information may be inaccurate either by input error or because of wrong information. Inaccurate demographic information for a person can lead to delivery delays of billing statements, difficulties with bill collection, and unnecessary operational costs.

Upon receiving entered demographic information for a person, embodiments provide for automatically standardizing received address information into a standard format, determining a breadth of a verification to perform for the person, and cross-matching the user's demographic information with information provided by one or more third party data sources. Results may be provided in near real-time so that any inconsistencies may be corrected on the front-end and thus avoiding unnecessary operation costs and improving billing and statement delivery.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
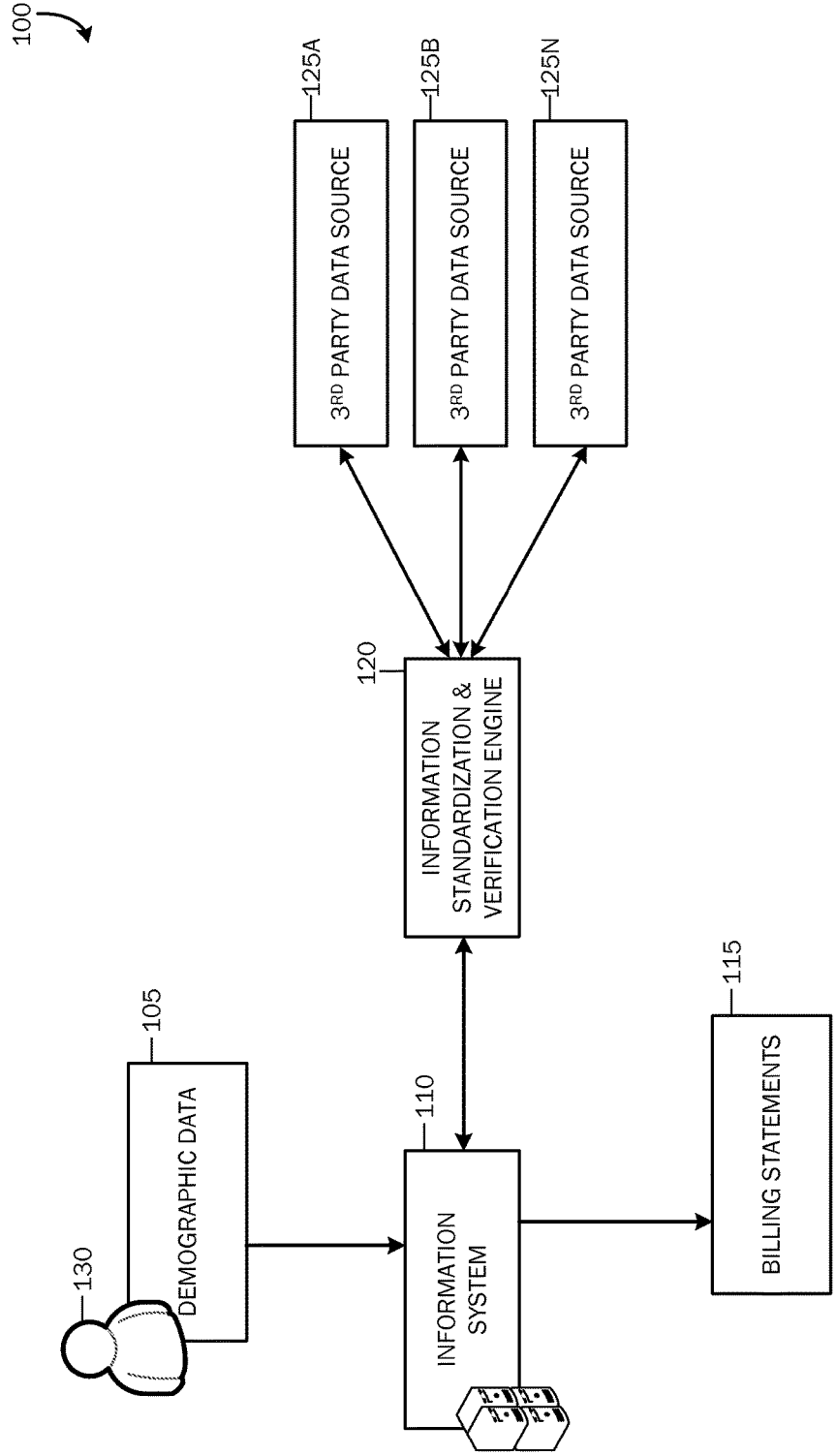
FIG. 1 is a simplified block diagram of a high-level system architecture with which embodiments of the invention may be implemented.

As briefly described above, embodiments of the present invention provide automatic information standardization and verification. Embodiments include an integrated and intelligent verification service for providing an automatic standardization of a person's address information, determining a level of verification needed to validate a person's demographic data, and cross-matching the person's demographic data with information received from one or more third party data sources.

Although embodiments of the present invention are described below with particular reference to a healthcare provider information system, embodiments may be implemented in any information system wherein demographic data may be received and verified with one or more third party data sources.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Referring now to FIG. 1, a simplified block diagram of a high-level system architecture 100 with which embodiments of the invention may be implemented is shown. As illustrated, demographic data 105 may be inputted into an information system 110. According to embodiments, an information system 110 may be associated with various types of service providers, businesses, institutions, etc. An information system 110 may include a database operable to receive and store data (including demographic data 105) associated with a recipient of goods, services, education, etc., (e.g., a patient, client, student, etc.) herein referred to as a "user" 130. For example, an information system 110 may be a healthcare provider patient database.

Details of a user 130 may be entered by the user 130 or by administrative personnel into an information system 110. The details of the user 130 may include demographic data 105 such as, but not limited to, the user's name, address, phone number(s), social security number, date of birth, gender, marital status, emergency contact information, employment status and details, student status and details, insurance information, guarantor information, etc. According to embodiments, demographic data 105 may be utilized for various purposes, which may include identification of a user 130, determination of an address to which to mail billing statements 115, verification of a user's eligibility for services, benefits, etc., and/or for categorization of a user.

As described briefly above, discrepancies of demographic data 105, for example, an incorrect or incomplete address either provided by a user 130 or incorrectly entered by administrative personnel, may lead to unnecessary operational costs due to such factors as billing statement 115 delivery delays, difficulties with bill collection, etc. According to embodiments, an information standardization and verification (ISV) engine 120 may be provided for standardizing user demographic data 105 and cross-matching the standardized user demographic data 105 with user data provided by one or more third party data sources 125. The one or more third party data sources 125 may include, but are not limited to, utility billing records, phone company listings, credit bureaus, the United States Social Security Administration's death master file, United States Postal Service® change of address records, state driver license databases; magazine subscription records, moving company records, mobile phone application information, rental agreements, rental applications, etc. The user data provided by the one or more third party data sources 125 may be received by the ISV engine 120 and compared with demographic data 105 in the information system 110. According to embodiments, standardization and verification of demographic data 105 may be performed in real time or essentially in real time as a user's demographic data 105 is received by an information system 110. For example, a user 130 may fill out a registration form at a healthcare provider office. While the user 130 is waiting for his appointment, an administrative person may enter the user's demographic data 105 into an information system 110. The demographic data 105 may be received by an ISV engine 120 and compared with user data provided by the one or more third party data sources 125. If any discrepancies are discovered, an alert may be provided. Accordingly, the healthcare provider may be alerted to incorrect demographic data 105 while the user 130 is still present, allowing the healthcare provider to approach the user 130 and correct any errant demographic data 105.

According to embodiments, automated address standardization may be provided. The ISV engine 120 may be operable to standardize a user's address by using United States Postal Office® standards. Standardized address information has been jointly developed by the Postal Service and the mailing industry to enhance the processing and delivery of mail in an effort to reduce undeliverable-as-addressed mail. An example of a United States Postal Office® standard includes a requirement for all letters in a postal address to be capitalized. As another example, oftentimes street suffix names (e.g., avenue) are provided using commonly used street suffixes or abbreviations (e.g., AV, AVEN, AVENUE, etc.). The United States Postal Office® recommends using official Postal Service standard suffix abbreviations (e.g., AVE). Standardizing users' 130 address information according to United States Postal Office® standards may help increase deliverability time, increase a percentage of successful billing statement 115 deliveries, and may aid in cross-matching address information with address information provided by one or more third party data sources 125.

According to an embodiment, the ISV engine 120 may be operable to determine a breadth of a verification search for a given user 130. Some third party data sources 125 may provide information for free or for a minimal charge, while other third party data sources 125 may be charge more. It may not make financial sense for a service provider, business, or institution to conduct a full verification using a large number of third party data sources 125, especially expensive third party data sources 125, for all users 130. Embodiments provide for determining a risk level associated with a user 130, and performing a verification search based on the determined risk level. The risk level may be determined based on a probability that the received demographic data 105 may be inaccurate (e.g., information and/or identifications provided by the user 105 have inconsistent information) and/or a value associated with an unpaid bill (non-payment by user 130) (e.g., is the user responsible for the full bill or is a payor, such as an insurance company, responsible for a portion of the bill; what is the cost/value of services; etc.) For example, in a healthcare environment, a determination may be made that a risk level for an uninsured patient (user 130) with a condition requiring a costly treatment may be higher than that of an insured patient (user 130) with various forms of matching identification. Accordingly, a determination may be made that a more in-depth verification may be warranted for the higher risk patient while alternatively, a determination may be made that an exhaustive verification may not be warranted for the lower risk patient. For example, a determination may be made that only an undeliverable-as-addressed (UAA) address verification may need to be performed for the lower risk patient. Various factors may be considered for determining a risk level which may include, but is not limited to, a type of service to be provided, the type and amount of information 105 provided by a user 130, whether information 105 provided by a user 130 is consistent, if in a healthcare environment, whether a user 130 is insured, etc.

Figure 2:
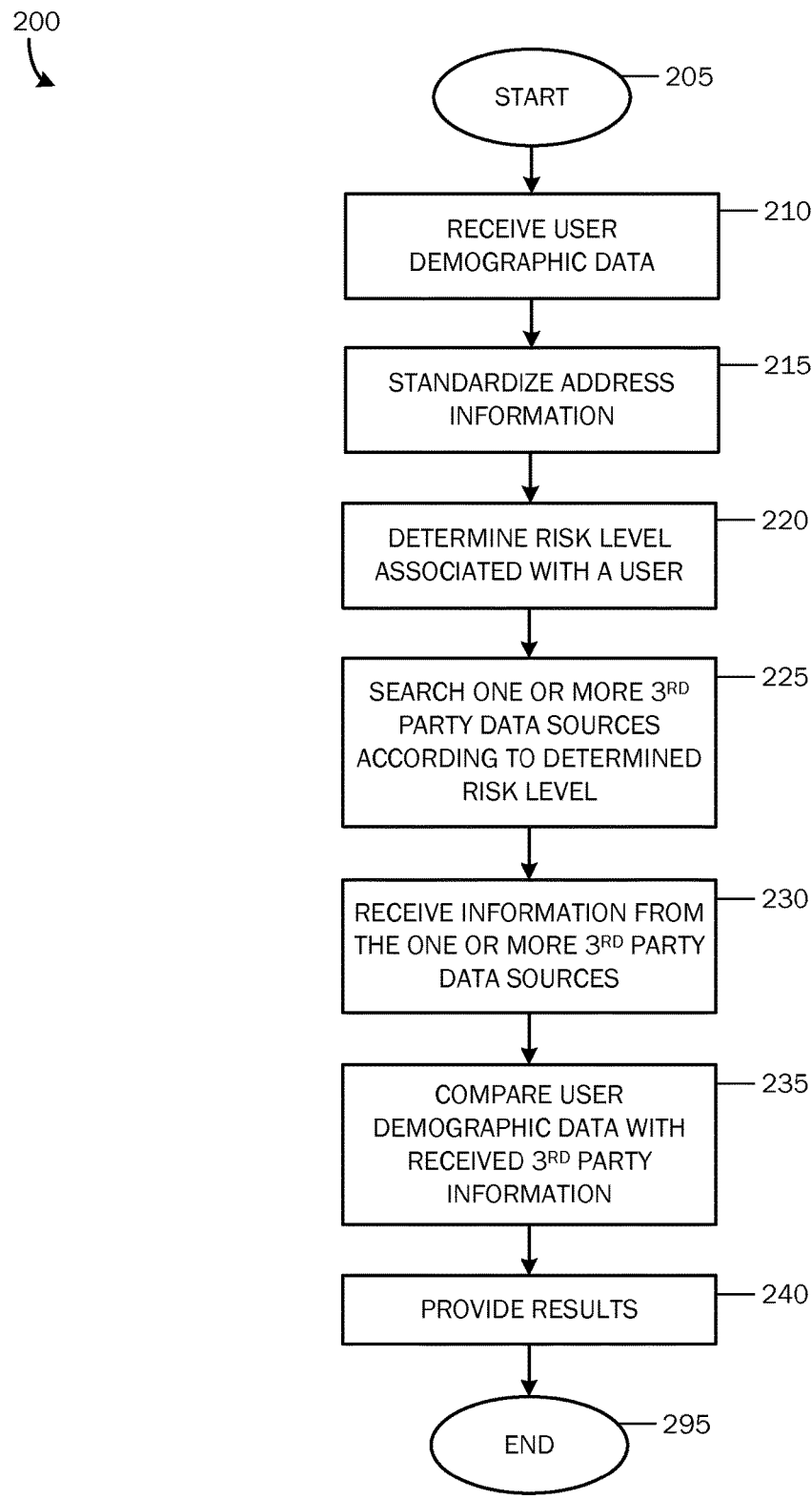
FIG. 2 is a process flow diagram illustrating a method of information standardization and verification.

Having described a system architecture 100, FIG. 2 is a process flow diagram illustrating a method 200 of providing information standardization and verification according to an embodiment. Referring now to FIG. 2, the method 200 starts at OPERATION 205 and proceeds to OPERATION 210 where user demographic data 105 is received. User demographic data 105 may be inputted into an information system 110 and may include information such as, but not limited to, the user's name, address, phone number(s), social security number, date of birth, gender, marital status, emergency contact information, employment status and details, student status and details, insurance information, guarantor information, etc.

The method 200 proceeds to OPERATION 215 where address information is standardized. According to embodiments and as described above, address information may be standardized according to United States Postal Service® standards. For example, if a user's address is "100 Main Street" and the address is input into an information system 110 as "100 main street," the address information may be standardized into a format such as, "100 MAIN ST".

The method 200 proceeds to OPERATION 220, where a risk level associated with a user 130 is determined. The risk level may be determined according to various factors which may include, but is not limited to, a type of service or goods the user 130 is seeking to be provided, the type and/or amount of information 105 provided by the user 130, whether information 105 provided by a user 130 is consistent, if in a healthcare environment, whether a user 130 is insured, etc. Based on the risk level determined for a user 130, a determination may be made as to the breadth of verification to perform. For example, a more extensive verification utilizing a number of third party data sources 125 may be performed for a higher-risk user 130 than for a lower-risk user 130.

At OPERATION 225, one or more third party data sources 125 may be searched for consistencies/inconsistencies of user demographic data 105. The number of and types of third party data sources 125 to be searched may be determined according to the risk level determined at OPERATION 220. According to an embodiment, an address verification may be performed for determining if a standardized address may be undeliverable as addressed (UAA). For example, a determination may be made that a "100 MAIN ST" in the city, state, and zip code provided does not exist. If an address is determined to be UAA, a determination may be made to perform further verification checks with other third party data sources 125. The address verification for determining if a standardized address may be UAA may be performed at OPERATION 220 as illustrated, or alternatively, according to another embodiment, may be performed prior to determining a risk level associated with a user 130. Further verification checks with other third party data sources 125 may include searching for such information as previous and current addresses, published phone number(s), a social security number, date of birth, etc.

The method 200 proceeds to OPERATION 230 where the information from the one or more third party data sources 125 may be received as data elements. At OPERATION 235, the received information may be compared with the user's 130 demographic data 105. The comparison may include finding consistencies and inconsistencies in data elements, determining how recent a data element is, from what data source 125 a data element is received, and associating a confidence level with data elements to determine a most-likely accurate demographic data element.

At OPERATION 240, a response is provided. The response may be provided to the user 130, for example, if the user is entering his demographic data 105 into a kiosk in a registration/check-in process. If the user's address is determined to be UAA or if the social security number he entered matches a social security number of a deceased person, the user 130 may be prompted to correct the information before he can proceeds with the registration/check-in process. If an administrative person is entering a user's demographic data 105, an alert may be provided to the administrative person that there are discrepancies in the entered information. The administrative person may be able to verify that the user's 130 demographic data 105 was entered correctly or if the user 130 gave incorrect information. When discrepancies exist, return results may be provided and may include confidence levels associated with the return results. The user 130 or administrative person may be able to select correct demographic data 105 from the provided return results. The method ends at OPERATION 295.

Embodiments of the invention may be implemented via local and remote computing and data storage systems. That is, each of the systems and devices illustrated in FIG. 1 may be implemented as one or more local or remote memory storage and processing units. Such memory storage and processing units may be implemented in a computing device, such as computing device 300 of FIG. 3. Any suitable combination of hardware, software, or firmware may be used to implement the memory storage and processing unit. For example, the memory storage and processing unit may be implemented with computing device 300 or any other computing devices 318, in combination with computing device 300, wherein functionality may be brought together over a network in a distributed computing environment, for example, an intranet or the Internet, to perform the functions as described herein. Such systems, devices, and processors (as described herein) are examples and other systems, devices, and processors may comprise the aforementioned memory storage and processing unit, consistent with embodiments of the invention.

Figure 3:
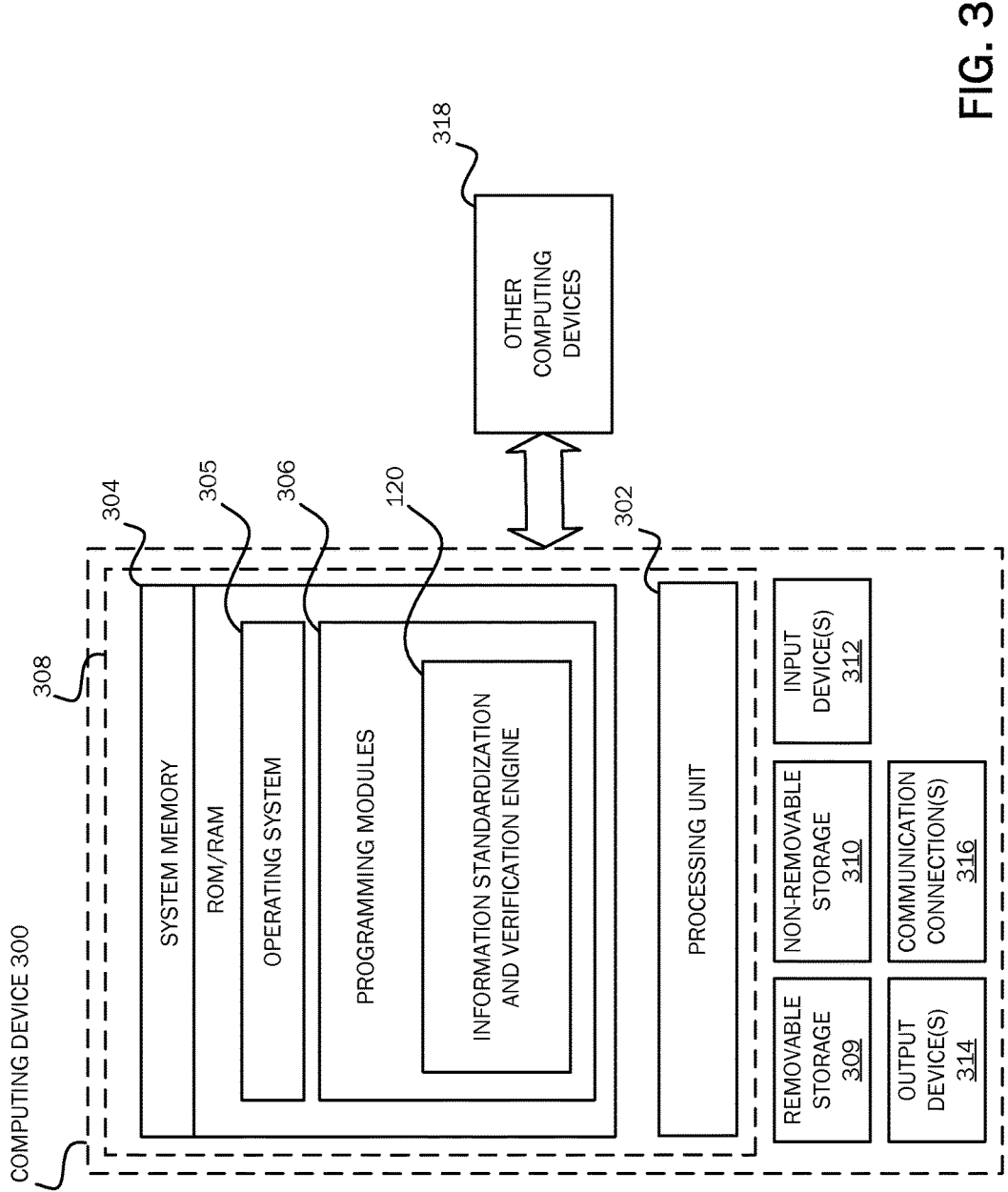
FIG. 3 is a simplified block diagram of a system including a computing device with which embodiments of the invention may be practiced.

With reference to FIG. 3, a system consistent with embodiments of the invention may include one or more computing devices, such as computing device 300. The computing device 300 may include at least one processing unit 302 and a system memory 304. The system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include an information standardization and verification (ISV) engine 120, wherein the ISV engine 120 has sufficient computer-executable instructions, which when executed, performs functionalities as described herein. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308. Computing device 300 may also include one or more input device(s) 312 (keyboard, mouse, pen, touch input device, etc.) and one or more output device(s) 314 (e.g., display, speakers, a printer, etc.).

Although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

The computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

Program modules, such as the ISV engine 120, may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable user electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, microcode, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

Embodiments of the present invention, for example, are described above with reference to block diagrams and/or operational illustrations of methods, systems, and computer program products according to embodiments of the invention. For example, each of the FIGS. 1-3 and the described functions taking place with respect to each illustration may be considered steps in a process routine performed by one or more local or distributed computing systems. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

All rights including copyrights in the code included herein are vested in and the property of the Applicant. The Applicant retains and reserves all rights in the code included herein, and grants permission to reproduce the material only in connection with reproduction of the granted patent and for no other purpose.

We claim:

1. A computer-implemented method of determining a risk level for a user to quantify a breadth of a search to perform using one or more of a plurality of different types of third party data sources comprising:
   receiving, at an information standardization and verification (ISV) engine, demographic data including address information associated with a user from a computer information system comprising a healthcare provider patient database;
   standardizing, via the ISV engine, the address information into a standardized address format to aid in cross-matching information returned in response to a search of one or more third party data sources, the standardizing based on a postal service standard requiring capitalization of letters in the address information and using standard suffix abbreviations;
   determining, via the ISV engine, the risk level for the user that quantifies whether to perform a search using the one or more of the plurality of different third party data sources, the risk level corresponding to a probability that the received demographic data is not accurate according to a type of service to be provided to the user and a type and amount of information associated with the user;
   determining, via the ISV engine, select ones of the plurality of different types of third party data sources to use for a verification search to verify the received demographic data according to the risk level associated with the user, wherein a patient having a higher risk level according to the probability requires additional verification steps including searching additional ones of the plurality of different types of third party data sources and a patient having a lower risk level according to the probability requires fewer verification steps without searching additional ones of the plurality of different types of third party data sources;
   searching, via the ISV engine, select ones of the plurality of different types of third party data sources according to the risk level associated with the user including only performing an undeliverable-as-addressed (UAA) address verification search for the patient having the lower risk level and performing the searching with the additional verification steps for the patient having the higher risk level including searching the additional ones of the plurality of different types of third party data sources;
   receiving, via the ISV engine, search results from the select ones of the plurality of different types of third party data sources according to the risk level associated with the user;
   cross-matching, via the ISV engine, the demographic data with the search results to determine inconsistencies between the demographic data including the standardized address information associated with the user and the search results received from the select ones of the plurality of different types of third party data sources; and
   providing to the computer information system, via the ISV engine, a verification result indicating whether the demographic data is consistent with the search results in real-time or essentially real-time according to the cross-matching.

2. The method of claim 1, wherein the risk level corresponds to whether the demographic data is inaccurate determined based on the inconsistencies within the demographic data or incomplete demographic data.

3. The method of claim 1, wherein the risk level corresponds further to a financial responsibility for the user for the service being provided, a cost of the service being provided, and a value of non-payment for services previously provided to the user.

4. The method of claim 1, wherein searching comprises searching according to the risk level associated with the user:
   utility billing records;
   phone company listings;
   credit bureaus;
   the United States Social Security Administration's death master file;
   United States Postal Service® change of address records;
   magazine subscription records;
   moving company records;
   mobile phone application information;
   rental agreements;
   rental applications; and
   state driver license databases.

5. The method of claim 1, further comprising performing an address verification before the searching to determine if a standardized address is undeliverable as addressed (UAA).

6. The method of claim 1, further comprising based on the search results, determining whether to search an additional third party data source for demographic data according to the risk level associated with the user.

7. The method of claim 1, wherein receiving search results comprises receiving additional verification information comprising:
   a previous address;
   a current address;
   a published telephone number;
   a social security number; or
   a date of birth.

8. The method of claim 1, wherein cross-matching-further comprises determining which search results are accurate based on an age of a received search result.

9. The method of claim 8, further comprising providing the search results in real-time or essentially real-time.

10. The method of claim 9, further comprising providing an alert when the demographic data and the search results are inconsistent in addition to providing the search results determined to be accurate.

11. A system that includes an information standardization and verification (ISV) engine to determine a risk level for a user to quantify a breadth of a search to perform using one or more of a plurality of different types of third party data sources, the system to:
   receive, via the ISV engine, demographic data associated with a user, the demographic data comprising address information;
   standardize, via the ISV engine, the address information into a standardized address format to aid in cross-matching information returned in response to a search of one or more third party data sources, the standardizing based on a postal service standard requiring capitalization of letters in the address information and using standard suffix abbreviations;
   determine, via the ISV engine, the risk level for the user that quantifies whether to perform a search using the one or more of the plurality of different third party data sources, the risk level corresponding to a probability that the received demographic data is not accurate according to a type of service to be provided to the user and a type and amount of information associated with the user;
   determine, via the ISV engine, select ones of the plurality of different types of third party data sources to use for a verification search to verify the received demographic data according to the risk level associated with the user, wherein a patient having a higher risk level according to the probability requires additional verification steps including searching additional ones of the plurality of different types of third party data sources and a patient having a lower risk level according to the probability requires fewer verification steps without searching additional ones of the plurality of different types of third party data sources;
   search, via the ISV engine, select ones of the plurality of different types of third party data sources according to the risk level associated with the user including only performing an undeliverable-as-addressed (UAA) address verification search for the patient having the lower risk level and performing the search with the additional verification steps for the patient having the higher risk level including searching the additional ones of the plurality of different types of third party data sources;
   receive, via the ISV engine, results from the select ones of the plurality of different types of third party data sources according to the risk level associated with the user;
   cross-match, via the ISV engine, the received demographic data with the received results to determine inconsistencies between the received demographic data including the standardized address information associated with the user and the received search results from the select ones of the plurality of different types of third party data sources;
   determine, via the ISV engine, which received results have accurate information; and
   provide, via the ISV engine, a verification result of determined accurate demographic data elements and alerts of any determined inconsistent demographic data elements in real-time or essentially real-time according to the cross-match.

12. The system of claim 11, wherein a type of third party data source used for the verification search is determined according to the risk level associated with the user.

13. The system of claim 12, wherein the risk level associated with the user is determined according to inconsistent received demographic data associated with the user.

14. The system of claim 12, wherein the risk level associated with the user is determined according to a value of non-payment.

15. The system of claim 11, further operable to determine whether to search additional third party data sources for demographic data associated with the user based on the received results from the select ones of the plurality of third party data sources.

16. A non-transitory computer readable medium containing computer executable instructions which when executed by a computer perform a method of determining a risk level for a user to quantify a breadth of a search to perform using one or more of a plurality of different types of third party data sources comprising:
   receiving, at an information standardization and verification (ISV) engine, demographic data associated with a user, the demographic data comprising address information from a healthcare provider patient database;
   standardizing, via the ISV engine, the address information into a standardized address format to aid in cross-matching information returned in response to a search of one or more third party data sources, the standardizing based on a postal service standard requiring capitalization of letters in the address information and using standard suffix abbreviations;
   determining, via the ISV engine, the risk level for the user that quantifies whether to perform a search using the one or more of the plurality of different third party data sources, the risk level corresponding to a probability that the received demographic data is not accurate according to a type of service to be provided to the user and a type and amount of information associated with the user;
   determining, via the ISV engine, select ones of the plurality of different types of third party data sources to use for a verification search to verify the received demographic data according to the risk level associated with the user, wherein a patient having a higher risk level according to the probability requires additional verification steps including searching additional ones of the plurality of different types of third party data sources and a patient having a lower risk level according to the probability requires fewer verification steps without searching additional ones of the plurality of different types of third party data sources;

searching, via the ISV engine, select ones of the plurality of different types of third party data sources according to the risk level associated with the user including only performing an undeliverable-as-addressed (UAA) address verification search for the patient having the lower risk level and performing the search with the additional verification steps for the patient having the higher risk level including searching the additional ones of the plurality of different types of third party data sources;

receiving, via the ISV engine, results from the select ones of the plurality of different types of third party data sources according to the risk level associated with the user;

cross-matching, via the ISV engine, the received demographic data with the received results to determine inconsistencies between the demographic data including the standardized address information associated with the user and the search results received from the select ones of the plurality of different types of third party data sources;

determining, via the ISV engine, whether to search an additional third party data sources for demographic data associated with the user based on the received results according to the risk level associated with the user; and providing, via the ISV engine, a verification result including the received results determined to be accurate and alerts of any determined inconsistent demographic data elements in real-time or essentially real-time according to the cross-matching.

17. The computer readable medium of claim 16, further comprising determining the risk level associated with the user according to inconsistent received demographic data associated with the user.

18. The method of claim 1, wherein the different types of third party data sources include data sources providing access to data for free and data sources charging for access to data, and using the risk level to determine if charging data sources are to be used for the additional verification steps.

* * * * *